United States Patent [19]

Suman et al.

[11] Patent Number: 5,040,990

[45] Date of Patent: Aug. 20, 1991

[54] MODULAR VEHICLE ELECTRONIC SYSTEM

[75] Inventors: Michael J. Suman; Sheldon J. Watjer, both of Holland, Mich.

[73] Assignee: Prince Corporation, Holland, Mich.

[21] Appl. No.: 535,337

[22] Filed: Jun. 8, 1990

Related U.S. Application Data

[63] Continuation of Ser. No. 350,014, May 9, 1989, abandoned.

[51] Int. Cl.⁵ .......................................... H01R 31/08
[52] U.S. Cl. ........................................ 439/34; 439/49; 296/37.7; 307/10.1; 361/393
[58] Field of Search ............... 439/34, 35, 36, 43, 439/49, 53; 296/37.7; 307/10.1; 361/352, 395, 393

[56] References Cited

U.S. PATENT DOCUMENTS

| | | | |
|---|---|---|---|
| 3,174,576 | 3/1965 | Woofter et al. | 180/90 |
| 3,270,831 | 9/1966 | Woofter et al. | 180/90 |
| 3,590,136 | 6/1971 | Kunishi et al. | 174/50 |
| 3,635,305 | 1/1972 | Kunishi et al. | 180/90 |
| 3,707,697 | 12/1972 | Izumi | 339/14 |
| 4,100,372 | 7/1978 | Hypolite | 296/37 |
| 4,133,405 | 6/1979 | Turek | 180/90 |
| 4,153,127 | 5/1979 | Klink et al. | 180/65 |
| 4,241,870 | 12/1980 | Marcus | 296/37 |
| 4,372,410 | 2/1983 | Loken et al. | 180/89 |
| 4,421,190 | 12/1983 | Martinson et al. | 180/90 |
| 4,505,054 | 3/1985 | Clark et al. | 33/357 |
| 4,620,268 | 10/1986 | Ferenc | 362/74 |
| 4,806,118 | 2/1989 | Herrmann | 439/621 |
| 4,818,010 | 4/1989 | Dillon | 296/37 |
| 4,844,533 | 7/1989 | Dowd et al. | 296/37 |
| 4,869,670 | 9/1989 | Ueda et al. | 439/34 |

FOREIGN PATENT DOCUMENTS

219440  9/1988  Japan ................................ 296/37

Primary Examiner—Gary F. Paumen
Attorney, Agent, or Firm—Price, Heneveld, Cooper, DeWitt & Litton

[57] ABSTRACT

A modular interchangeable electronic system for providing a number of different options for a vehicle which can be selectively plugged into a base unit. The base unit can receive or be replaced by selected optional units which interface with vehicle controls or provide desired control or display functions.

27 Claims, 5 Drawing Sheets

MODULAR VEHICLE ELECTRONIC SYSTEM

This is a continuation of copending application Ser. No. 07/350,014 filed on May 9, 1989, now abandoned.

BACKGROUND OF THE INVENTION

The present invention pertains to an electronic modular display and control system for use in a vehicle and particularly one which allows installation of several optional modular units for different control and display functions.

In recent years, vehicles such as automobiles, have begun using display systems located in areas different than the typical dashboard area. One such installation is a console mounted in the center roof area between the vehicle visors and which includes both an electronic compass and a garage door opening transmitter housing. Such a system is shown in U.S. Pat. No. 4,505,054 issued Mar. 19, 1985 to the present assignee. This unit can be purchased by the vehicle owner as an optional accessory or comes as standard equipment on some vehicles.

Although vehicles have included these types of displays as well as other overhead counsel displays for providing for example, a systems check for a variety of control functions and engine operating parameters; systems today have not allowed either the user or the vehicle dealer to provide optional accessories after the purchase of the vehicle without major installation requirements.

SUMMARY OF THE PRESENT INVENTION

The system of the present invention provides a modular interchangeable electronic system for providing a number of different options which can be plugged into a base unit to provide selected options for the vehicle purchaser either at the time of purchase of later. Systems embodying the present invention include a base unit which is mounted to a socket which is standard on all vehicles. The base unit can receive or be replaced by selected optional units which interface with vehicle controls or provide desired display functions. Each unit includes means for programming the unit for interfacing with the vehicle once installed.

With such a system, vehicles can be made with a base level overhead module which can be upgraded with selected options and which options can be selectively changed subsequent to the purchase of the vehicle by plugging in different modules.

These and other features, objects and advantages of the present invention will become apparent upon reading the following description thereof together with reference to the accompanying drawings, in which:

DETAILED DESCRIPTION OF THE PREFERRED EMBODIMENT

Figure 1:
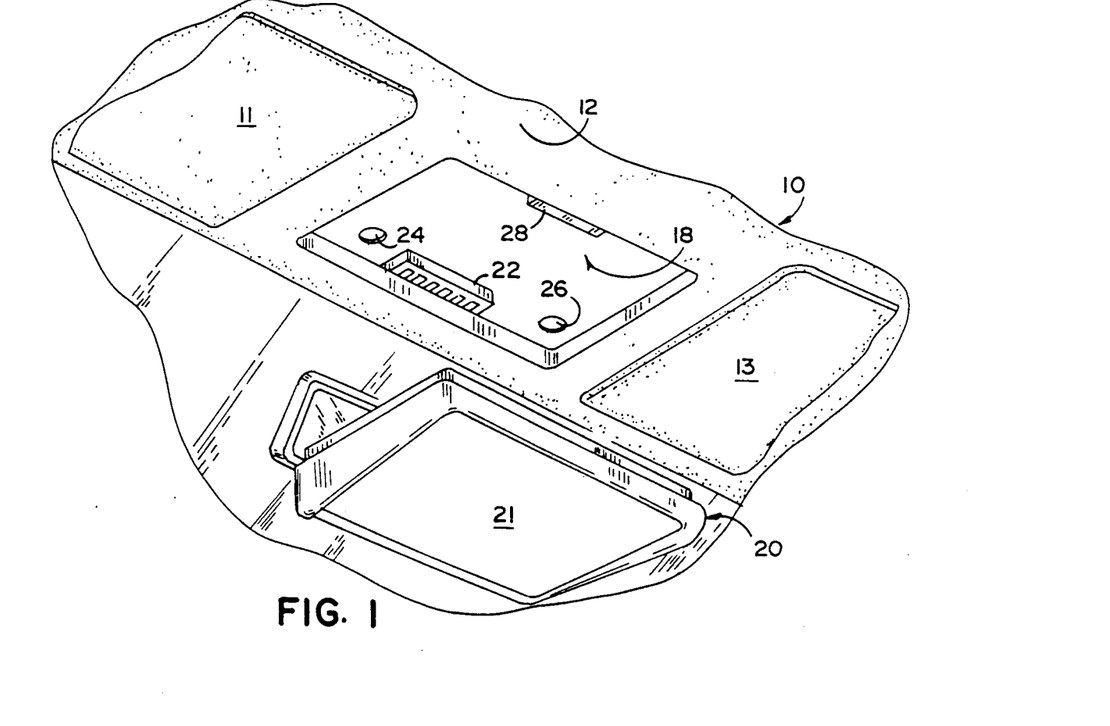
FIG. 1 is a fragmentary perspective view partly exploded of a vehicle including a socket with an elementary plug-in module.

Referring initially to FIG. 1, there is shown a vehicle 10 having a roof 12 and windshield 14 to which a rearview mirror 16 is attached in a conventional manner. Attached to the vehicle roof are a pair of visors 11 and 13 on either side of the center area of the roof which includes a recess 18 including a socket 22 for receiving a variety of plug-in modules such as a base module 20 shown. Recess 18 accordingly includes both mechanical and electrical interconnection means with the system illustrated in FIG. 1 including a plug-in electrical socket 22, a pair of guide apertures 24 and 26, and a mechanical latch 28 which mates with correspondingly shaped and configured electrical and mechanical connectors included in the base unit 20. Thus unit 20 will include an electrical plug 27 (FIG. 5) which is aligned with and mates with the electrical socket 22, a pair of posts (not shown) which mechanically align and interfit within circular apertures 24 and 26 in the roof structure and a resilient or moveable latch member which interlocks with latch 28 for snap fitting module 20 within recess 18. A few of the various different modules which can either be incorporated in the base unit or plugged into the base unit which in turn is plugged into socket 22 are shown pictorially in FIG. 2.

Figure 2:
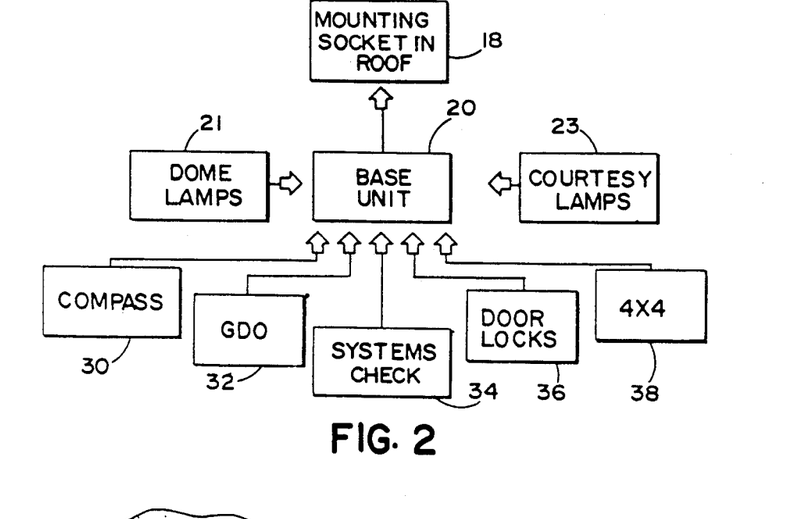
FIG. 2 is a block diagram illustrating a variety of optional plug-in modules which can be used with the system shown in FIG. 1.
Figure 3:
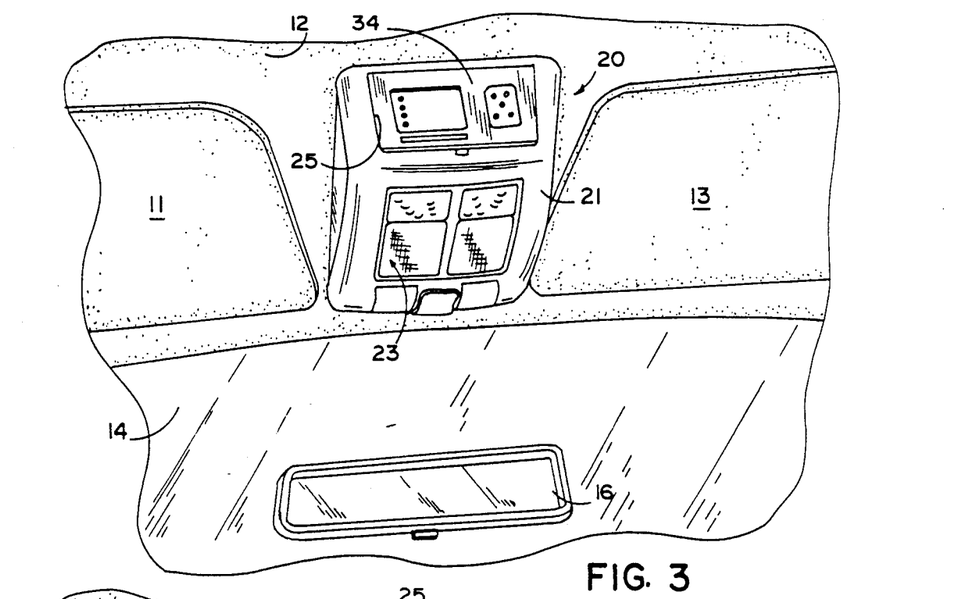
FIG. 3 is a fragmentary perspective view of a vehicle showing a systems check module with a courtesy lamp option installed therein.
Figure 4:
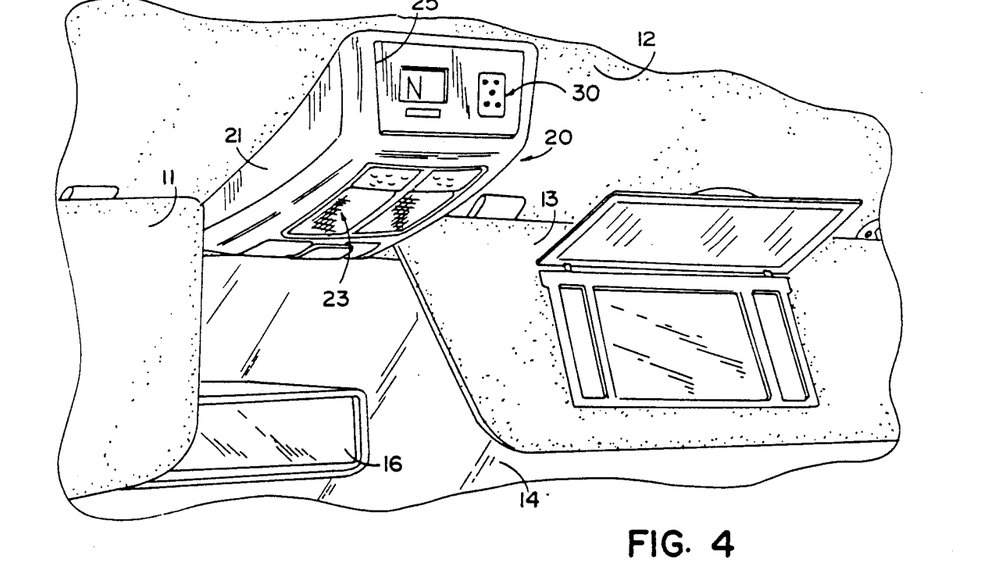
FIG. 4 is a fragmentary perspective view of a vehicle showing a compass module and courtesy lamp option installed therein.
Figure 5:
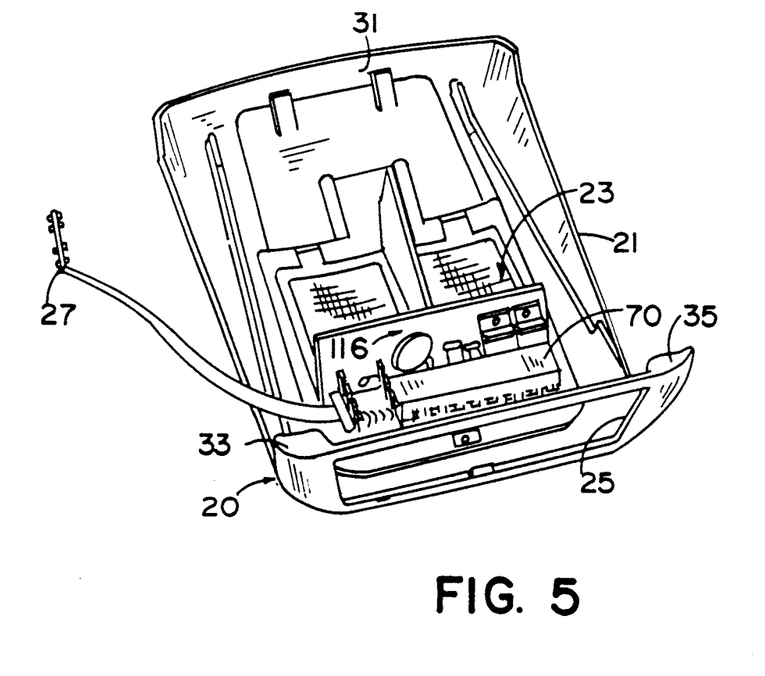
FIG. 5 is a top perspective view of the base housing shown in FIG. 2 and 3.

In FIG. 2, the base unit 20 may include a simple dome lamp 21 as seen in FIG. 1 or individually operated courtesy lamps 23 as seen in the FIGS. 3, 4 and 5 embodiments of the invention. In addition, the base unit 20 may include a base module housing 21 (FIGS. 4 and 5) with an opening 25 for receiving plug-in modules such as a systems check module 34 (FIG. 3), a compass module 30 (FIG. 4), a garage door opening module 32, a doorlock control module 36, or a 2-wheel/4-wheel drive control and display module 38. It is understood that each of these modules of the embodiment shown in FIG. 2-7 plug into the base unit housing 21 which in turn plugs into the recess 18 and electrically plugs into socket 22 as seen in FIG. 1.

Figure 6:
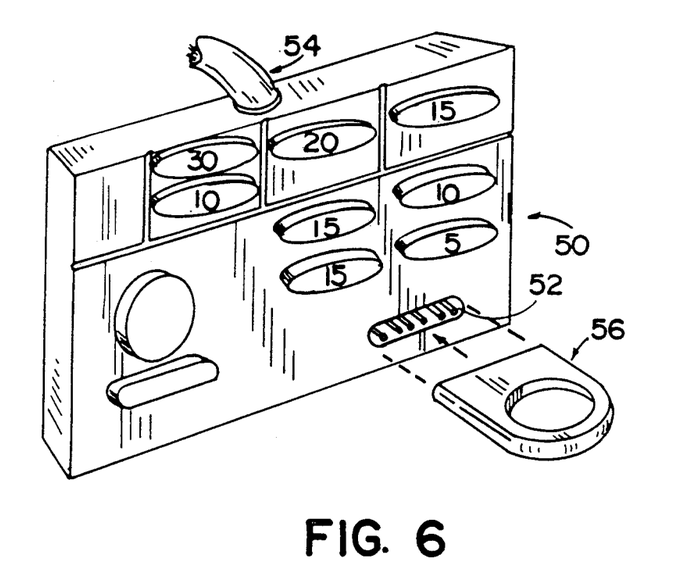
FIG. 6 is a fragmentary perspective view of a programming jumper system for connecting the vehicle wiring system to the selective module.

In order to provide a universal interface between the selected optional module and the vehicle power supply, vehicle device being controlled, or parameter being displayed; program means is provided which in the preferred embodiment is a typical automotive fuse box 50 which is modified to be programmable by insertion of a selected plug-in program module 56 as shown in FIG. 6. The fuse box 50 includes a multiple pin electrical socket 52 mounted therein which is connected by a multiple conductor cable 54, as shown in greater detail in FIG. 7, to various vehicle supply and control units as well as to electrical socket 22 of recess 18 in the vehicle roof 12. The various pins of socket 52 in fuse box 50 are shown in detail in FIG. 7 and receive a predetermined programming plug-in programming member 56 which includes a corresponding number of pins which mate with socket 52 and which are interconnected to connect predetermined ones of the socket connections to each other as described in greater detail in connection with FIG. 7.

Figure 7:
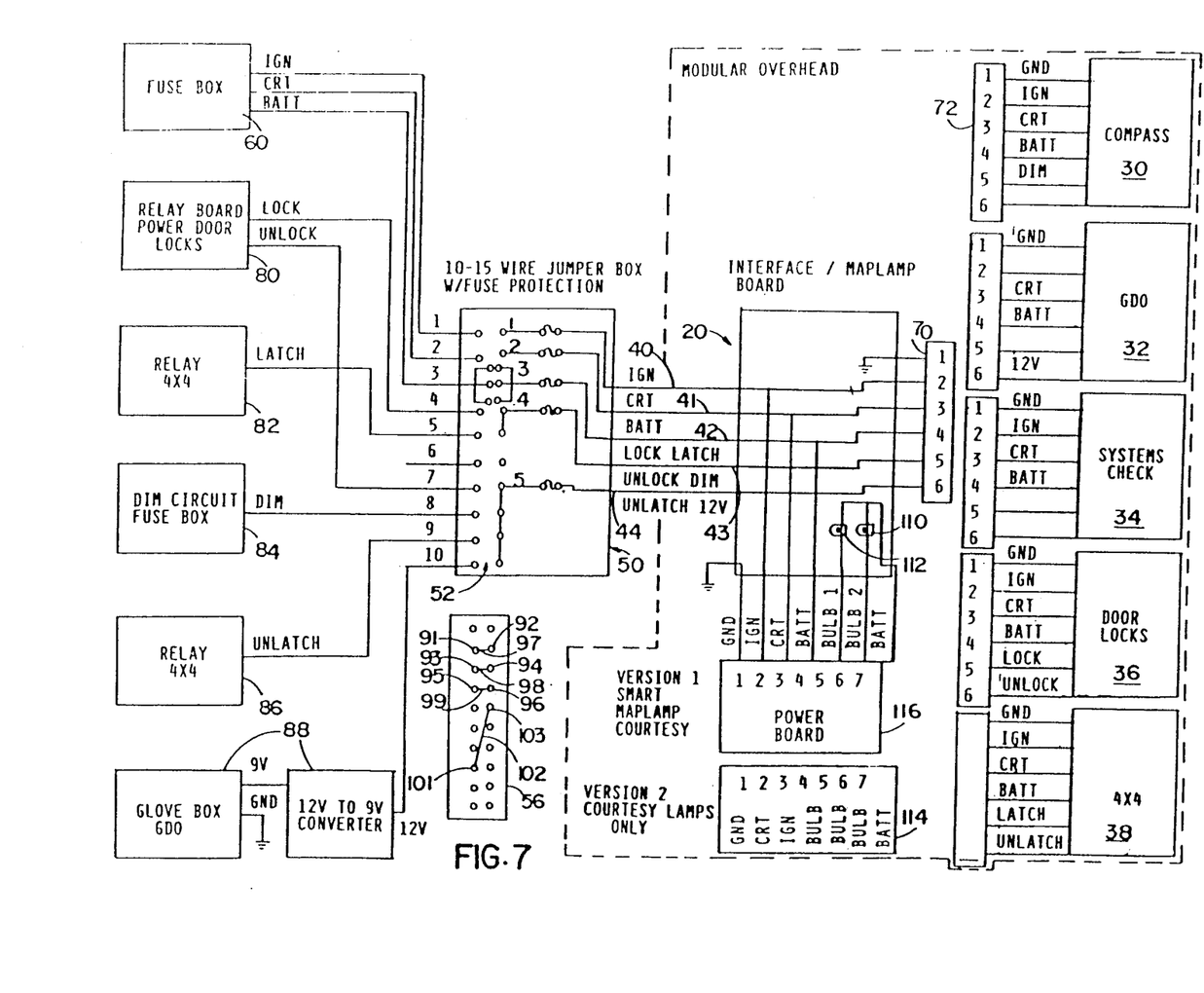
FIG. 7 is an electrical circuit diagram partially in block and schematic form showing the wiring of the system of the present invention.

Referring now to FIG. 7, cable 54 includes 10 conductors numbered 1 through 10 which extend to and are coupled to a variety of vehicles supply and control circuits such as circuits 60, 80, 82, 84, 86 and 88. Cable 54 also includes, within the outer sheath thereof, output conductors 40, 41, 42, 43 and 44 which are selectively programmably coupled to ones of the input conductors 1-10 through the programming module 56. Module 56 in the preferred embodiment therefore essentially comprises a selective shorting bar which plugs into socket 52 for coupling conductors of cable 54 together.

As an example, with respect to the FIG. 4 embodiment utilizing the compass module 30, the aligned top three pins 91, 93 and 95 are shorted to pins 92, 94 and 96 respectively of program module 56 by conductors 97, 98 and 99. When module 56 is plugged into fuse box 50, the ignition conductor 1, the courtesy power conductor 2, and the battery power conductor 3 from a part of the vehicle's fuse box 50 show schematically as block 60 in FIG. 7 are thus coupled to conductors 40, 41 and 42 of cable 54 which in turns are coupled to pins 2, 3 and 4 on socket 70 contained within a base unit 20. The compass module 30 which plugs into the base unit housing 21 includes a corresponding plug 72 corresponding to socket 70 such that when interconnected with the corresponding pin numbers indicated in FIG. 6, the pins 2, 3 and 4 will be coupled to conductors 40, 41 and 42 in turn coupled to conductors 1-3 of cable 54 through programmed connector 56 identified as the compass connector. Module 56 also has pin 101 electrically coupled to pin 103 by conductor 102 to couple conductor 8 of cable 54 to conductor 43 and thus provide a dimming control signal to the compass module through interconnected pins plug 72 and socket 70.

Other modules such as the systems check module 34 illustrated in FIG. 3 will have different programmed connectors 56 programmed to similarly connect the conductors of cable 54 to one another for supplying either power to or signals to and from their respective module and associated vehicle control unit. The vehicle units include a relay board 80 for the power locks, a control relay for 82 controlling the 2-wheel/4-wheel drive unit, a dimmer circuit control 84, a trunk unlocking relay control board 86 and a regulated 12 volt control circuit 88.

The base module 20 as seen in FIGS. 1, 5 and 7 may include a pair of courtesy lamps 110 and 112 (FIG. 7) controlled by a first or second electrical control circuit such as a simplified circuit 114 used for activating the FIG. 1 embodiment lights or a more sophisticated control circuit 116 shown in the embodiments of FIGS. 5 and 7 whereby independent map lamps are provided with slow on and off capability. Typically the base unit will include one or the other of circuits 114 and 116 and more typically circuit 116 with the ability to receive the optional modules such as modules 30, 32, 34, 36 or 38 each of which includes a plug which correspondingly aligns with and electrically couples the individual module to socket 70 in the base unit 20 within housing 21 thereof. Each of the modules are thus shaped as seen in FIGS. 3 and 4 to fit within the generally rectangular aperture 25 of the base unit housing 21 which housing can be attached to the vehicle headliner in a variety of manners including a rear snap fitting latch 31 and snap fitting front tabs 33 and 35 as seen in FIG. 5 which mate with corresponding brackets mounted within recess 18 as an alternative to the structure shown in FIG. 1. There are also a variety of manners in which the base units can be coupled to conductors 40-44 and two examples of such interconnections are shown in the remaining FIGS. 8-11 now described. It is understood that the ground conductor connection for the various modules is typically made through connection to the sheet metal structure of the vehicle and is not separately described.

Figures 8, 9:
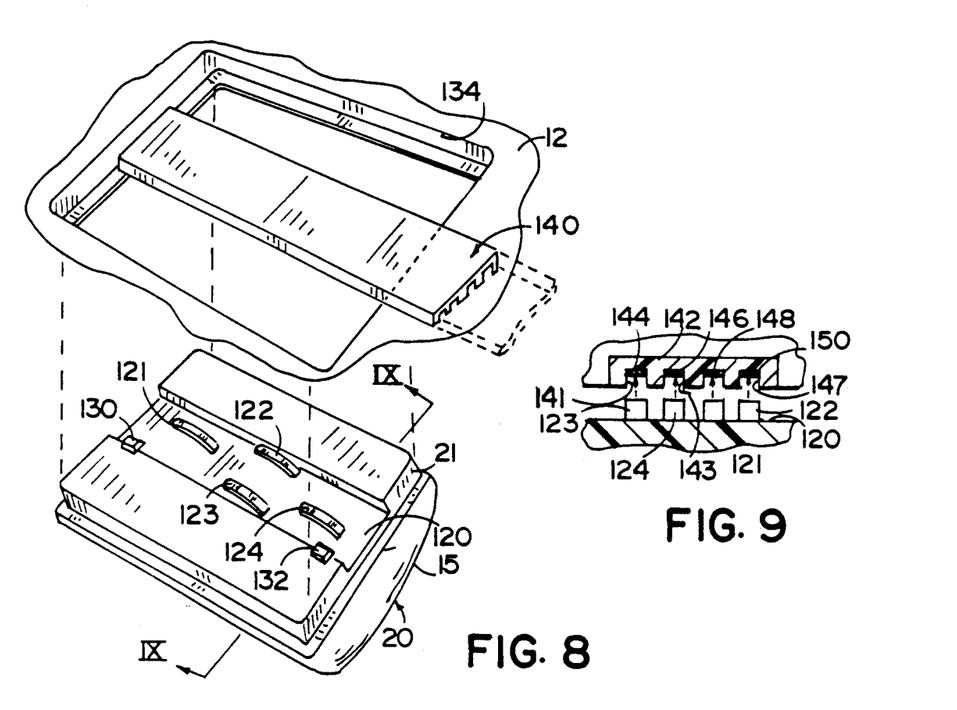
FIG. 8 is a perspective exploded view of an alternate mounting system for the modules of the present invention.
FIG. 9 is a fragmentary cross-sectional view taken along section lines IX—IX of FIG. 8.
Figures 10, 11:
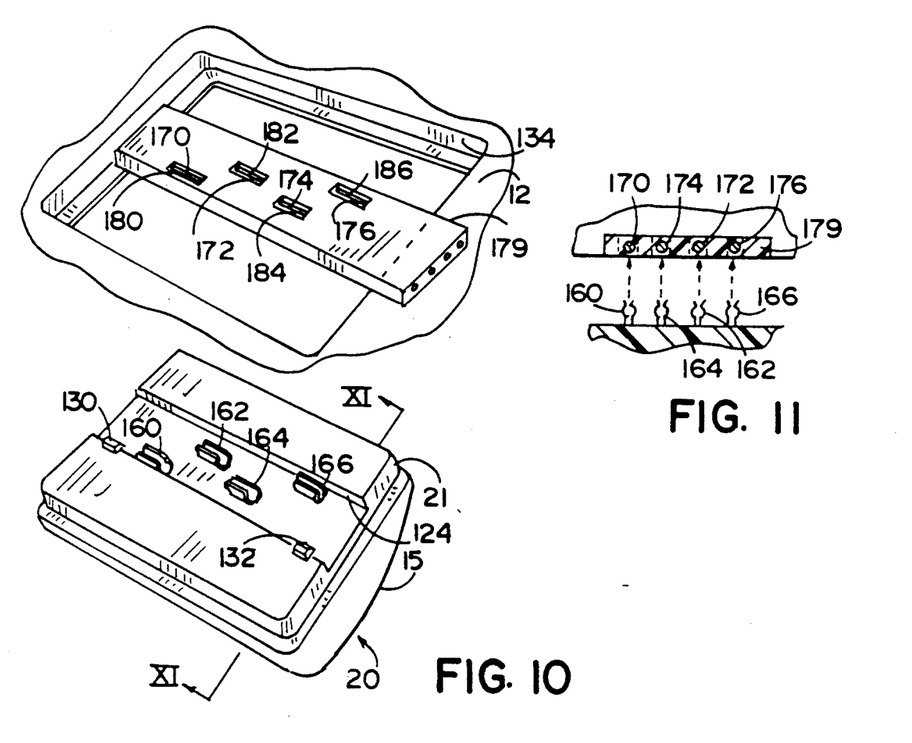
FIG. 10 is an exploded fragmentary view of an other alternate mounting system for the modules of the present invention.
FIG. 11 is a fragmentary cross-sectional view of the structure shown in FIG. 10 taken along section lines XI—XI of FIG. 10.

Referring initially to FIGS. 9 and 10, the base module 20 shown therein may include for example a dome light 115 of the type controlled by a circuit 114 associated with the base unit and a housing 21 which includes a longitudinally recessed track 120 having a plurality of curved spaced aligned contacts 121, 122, 123 and 124 extending outwardly from the upper surface of recess 120. Contacts 121-124 can be made of beryllium copper or other spring-like conductive material and are coupled to the courtesy lamps 110 and 112 contained within dome light 115 or pins of a connector 70 contained within a base module if the module is designed for receiving a plurality of display and control modules such as 30, 32, 34, 36 or 38. Housing 21 shown in FIG. 8 includes latch means 130 and 132 shown schematically in FIG. 8 for snap locking the base unit 20 within a recess 134 in the vehicle roof 12. Extending longitudinally across recess 134 is a ribbon-like connector 140 made of a generally rectangular (in cross-section) piece of flexible polymeric non-conductive material 142 (FIG. 9) having longitudinally extending slots 141, 143, 145 and 147 formed therein into which there is inlaid elongated electrical contact strips 144, 146, 148 and 150. Strips 144, 146, 148 and 150 engage as illustrated in FIG. 9 when base unit 20 is snapped into position within recess 134, the spaced electrical contacts 121, 122, 123 and 124 for transferring power to or signals to and from the vehicle control to which the contacts strips 144, 146, 148 and 150 are coupled and the base unit 20. In FIGS. 8 and 9 only four contacts and contact strips are shown it being understood that the unit may include as many as necessary for intercoupling the base unit to the socket defined by recess 134 and connector strip 140. Strip 140 may extend from the front windshield area of the vehicle to the back window for also applying power to rear seat accessories such as overhead drop down vanity mirrors, and rear window brake lights.

An alternate method of coupling the housing 21 of base unit 20 is shown in FIGS. 10 and 11 in which the housing 21 includes a plurality of electrical spring clips 160, 162, 164 and 166 which are spaced in staggered relationship along the longitudinal axis of the recess 120 formed in base housing 21. The clips snap fit over conductors 170, 172, 174 and 176. Which are embedded in a polymeric base 180 which is cut away in rectangular areas aligned with connector clips 160, 162, 164 and 166 as illustrated by recesses 179, 182, 184 and 186. The spring clips thus fit within the base 180 and electrically and mechanically engage the conductors when housing 21 is snapped fitted within recess 1 34 in the headliner 12. Again as with conductor strip 140, connector 179 may include a greater number of conductors extending in parallel relationship and aligned with a greater number of contact clips associated with base housing 21.

These and other modifications to the preferred embodiments of the invention as described herein can be made by those skilled in the art without departing from the spirit or scope of the invention as defined by the appended claims.

The embodiments of the invention in which an exclusive property or privilege is claimed are defined as follows:

1. A vehicle accessory system comprising a base module mounted to a vehicle, said base module including a first accessory and further including first electrical connecting means and further including first electrical connecting means to the vehicle's electrical system, said base module further including means for receiving a select one of a plurality of accessory modules; and at least one accessory module including means for mechanically coupling said accessory module to said base module and further including second electrical connecting means for coupling said accessory module to said first electrical connecting means and wherein said means for electrically coupling said first electrical connecting means to the vehicle's electrical system comprises first conductors coupled to said first electrical connecting means, second electrical conductors coupled to said vehicle's electrical system, and means for selectively coupling said first electrical conductors to said second electrical conductors to interface with a selected one of said accessory modules such that said means for selectively coupling interconnects selected ones of said first conductors to selected ones of said second conductors for selectively changing said first and second conductors which are interconnected to be when different accessory modules are received in said base module.

2. The system as defined in claim 1 wherein said system includes a plurality of accessory modules.

3. The system as defined in claim 2 wherein said means for selectively coupling includes a universal connector having first terminals coupled to said first electrical conductors and second terminals coupled to said second electrical conductors and a plurality of programming connectors with one of said programming connectors associated with each one of said accessory modules for interconnecting selected first and second terminals whereby at least one first terminal can be coupled to different second terminals by changing said programming connectors.

4. The system as defined in claim 3 wherein said universal connector comprises a socket including said first terminals and said second terminals, and said programing connectors comprise a plurality of plugs for selectively coupling selected ones of said first terminals to selected ones of said second terminals using a plug unique to a selected said accessory module.

5. The system as defined in claim 4 wherein a first said accessory module comprises light means.

6. The system as defined in claim 5 wherein said base module is mounted to the roof area of the vehicle.

7. The system as defined in claim 1 wherein said at least one accessory module is a compass module.

8. The system as defined in claim 1 wherein said at least one accessory module is a garage door opening module.

9. The system as defined in claim 1 wherein said at least one accessory module is a systems check module.

10. The system as defined in claim 1 wherein said at least one accessory module is a door-lock control module.

11. The system as defined in claim 1 wherein said at least one accessory module is a 2-wheel/4-wheel drive control and display module.

12. The system as defined in claim 1 wherein said means for selectively coupling couples said first connecting means to the vehicle's electrical system in accordance with a control or display option of a selected accessory module.

13. The system as defined in claim 1 wherein said means for coupling said first electrical connector to the vehicle's electrical system further includes a ribbon-like substrate of insulating material including a plurality of spaced generally parallel conductors mounted therein, said substrate mounted to extend across a module receiving recess in the vehicle, and wherein said base module is shaped to be mounted in said recess and includes contact means for engaging at least predetermined ones of said spaced conductors.

14. The system as defined in claim 13 wherein said substrate includes elongated grooves for receiving inlaid conductors and wherein said contact means comprises spring contacts which extend into said grooves to contact said conductors.

15. The system as defined in claim 13 wherein said substrate includes a plurality of openings for exposing sections of said conductors and wherein said contact means comprises spring clips aligned with said openings to engage said conductors when said module is mounted within said recess.

16. A vehicle accessory system comprising:
a base module for attaching to the vehicle for receiving a selected one of a plurality of accessory modules and including a first electrical connector having conductors;
at least one accessory module including means for connecting to the first electrical connector; and
a selective electrical connector coupled between the first electrical connector and the vehicle's electrical system, the vehicle's electrical system including the vehicle's fuse box and conductors, said selective connector for selectively providing a plurality of connections between the first electrical connector and the vehicle's electrical system including the vehicle's fuse box for selectively coupling at least one conductor of said first electrical connector to different conductors of the vehicle's electrical system according to display or control options of the plurality of accessory modules.

17. The system as defined in claim 16 wherein said base module further includes a light means for illuminating the interior of the vehicle.

18. The system in claim 16 wherein the selective connector provides a respective unique connection for each of the plurality of the accessory modules.

19. The system as defined in claim 16 wherein said plurality of accessory modules comprise a compass module, a garage door opening module, a systems check module, a door-lock control module or a 2-wheel/4-wheel drive control and display module.

20. The system as defined in claim 16 wherein one of said conductors of said first electrical connector is switchingly connected to the vehicle's fuse box by said selective connector.

21. The system as defined in claim 16 wherein said selective connector connects some of the conductors of said first electrical connector to some of the conductors of said vehicle's electrical system, and the conductors of said first electrical connector connected to the conductors of said vehicle's electrical system can be changed by said selective connector to program said system for different selected accessory modules.

22. A vehicle accessory system comprising:
a base mounted to a vehicle, said base including means for receiving an accessory module, said means for receiving including a first electrical connecting means for coupling to said accessory module and means for coupling said first electrical connecting means to said vehicle's electrical system;
at least one accessory module adapted to be inserted into said means for receiving and adapted to be coupled to said first electrical connecting means; and
a programming means including first terminals coupled to the first electrical connecting means and second terminals coupled to said vehicle's electrical system, said programming means programming a connection between said first and second terminals by selectively interconnecting different ones of said first and second terminals whereby different ones of said first and second terminals can be interconnected when different respective accessory modules are received in said base.

23. The accessory system as defined in claim 22 wherein said programming means includes a socket including said terminals and a respective plug for each of said different respective accessory modules, whereby a respective plug is inserted into said socket to connect a respective said accessory module to said vehicle's electrical system.

24. The accessory system as defined in claim 23 wherein said programming means can connect at least one of said first terminals to different ones of said second terminals for coupling said different accessory modules to different vehicle electrical circuits.

25. The system as defined in claim 22 wherein said means for coupling said first electrical connector to the vehicle's electrical system includes a ribbon-like substrate of insulating material including a plurality of spaced generally parallel conductors mounted therein, said substrate mounted to extend across a module receiving recess in the vehicle, and wherein said base module is shaped to be mounted in said recess and includes contract means for engaging at least predetermined ones of said spaced conductors.

26. The system as defined in claim 25 wherein said substrate includes elongated grooves for receiving inlaid conductors and wherein said contact means comprises spring contacts which extend into said grooves to contact said conductors.

27. The system as defined in claim 25 wherein said substrate includes a plurality of openings for exposing sections of said conductors and wherein said contact means comprises spring clips aligned with said openings to engage said conductors when said module is mounted within said recess.

* * * * *

UNITED STATES PATENT AND TRADEMARK OFFICE
CERTIFICATE OF CORRECTION

PATENT NO. : 5,040,990

DATED : August 20, 1991

INVENTOR(S) : Michael J. Suman et al.

It is certified that error appears in the above-identified patent and that said Letters Patent is hereby corrected as shown below:

Column 5, Line 1:
"1 34" should be --134--.

Column 5, Line 17:
"further including" should be --means coupling--.

Column 5, Line 40:
"interconnected to be" should be --to be interconnected--.

Column 8, Line 21:
"contract" should be --contact--.

Signed and Sealed this

Twenty-third Day of February, 1993

*Attest:*

STEPHEN G. KUNIN

*Attesting Officer*     Acting Commissioner of Patents and Trademarks